United States Patent
Thomsen et al.

(10) Patent No.: US 7,151,065 B2
(45) Date of Patent: Dec. 19, 2006

(54) GREY GLASS COMPOSITION

(75) Inventors: Scott V. Thomsen, Milford, MI (US); Richard Hulme, Rochester Hills, MI (US); Leonid Landa, Grosse Ile, MI (US); Ksenia A. Landa, Grosse Ile, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 157 days.

(21) Appl. No.: 10/622,834

(22) Filed: Jul. 21, 2003

(65) Prior Publication Data

US 2005/0020430 A1    Jan. 27, 2005

(51) Int. Cl.
*C03C 3/087* (2006.01)

(52) U.S. Cl. .................. 501/71; 501/70; 501/904; 501/905

(58) Field of Classification Search .............. 501/70, 501/71, 904, 905, 71 M
See application file for complete search history.

(56) References Cited

U.S. PATENT DOCUMENTS

| | | | |
|---|---|---|---|
| 5,023,210 | A | 6/1991 | Krumwiede et al. |
| 5,214,008 | A | 5/1993 | Beckwith et al. |
| 5,264,400 | A | 11/1993 | Nakaguchi et al. |
| 5,308,805 | A | 5/1994 | Baker et al. |
| 5,318,931 | A | 6/1994 | Nakaguchi et al. |
| 5,346,867 | A | 9/1994 | Jones et al. |
| 5,364,820 | A | 11/1994 | Morimoto et al. |
| 5,411,922 | A | 5/1995 | Jones |
| 5,569,630 | A | 10/1996 | Landa et al. |
| 5,656,560 | A | 8/1997 | Stotzel et al. |
| 5,905,047 | A | 5/1999 | Sasage et al. |
| 5,932,502 | A | 8/1999 | Longobardo et al. |
| 6,080,695 | A | 6/2000 | Scheffler-Hudlet et al. |
| 6,103,650 | A | 8/2000 | Krumwiede |
| 6,114,264 | A | 9/2000 | Krumwiede et al. |
| 6,235,666 | B1 | 5/2001 | Cochran et al. |
| 6,436,860 | B1 | 8/2002 | Seto et al. |
| 6,521,558 | B1 | 2/2003 | Landa et al. |
| 6,573,207 | B1 | 6/2003 | Landa et al. |
| 6,821,918 | B1 * | 11/2004 | Boulos et al. ............... 501/70 |
| 6,858,553 | B1 * | 2/2005 | Seto et al. ................... 501/70 |
| 2002/0068678 | A1 * | 6/2002 | Seto et al. ................... 501/70 |
| 2003/0216242 | A1 * | 11/2003 | Arbab et al. ................ 501/71 |
| 2004/0102304 | A1 * | 5/2004 | Boulos et al. ............... 501/70 |
| 2004/0116271 | A1 * | 6/2004 | Thomsen et al. ........... 501/71 |
| 2004/0171473 | A1 * | 9/2004 | Teyssedre et al. .......... 501/70 |

FOREIGN PATENT DOCUMENTS

| | | |
|---|---|---|
| EP | 0 811 581 | 9/2002 |
| FR | 2826649 A1 * | 1/2003 |
| JP | 7-109147 | 4/1995 |
| JP | 11-60269 | 3/1999 |
| WO | WO 00/76928 | 12/2000 |
| WO | WO 02/059052 | 8/2002 |

* cited by examiner

*Primary Examiner*—Karl Group
*Assistant Examiner*—Elizabeth A. Bolden
(74) *Attorney, Agent, or Firm*—Nixon & Vanderhye P.C.

(57) ABSTRACT

A grey glass composition employing in its colorant portion at least iron ($Fe_2O_3$/FeO), cerium, cobalt and selenium is provided. The glass allows high visible transmission, and satisfactory IR and UV absorption, while at the same time achieving desired grey color. In certain example embodiments, the colorant portion includes, or may consist essentially of:

| | |
|---|---|
| total iron (expressed as $Fe_2O_3$): | 0.25 to 0.70% |
| cerium oxide: | 0.01 to 1.0% |
| selenium: | 0.0001 to 0.05% |
| cobalt oxide: | 0.0001 to 0.05% |
| titanium oxide: | 0 to 1.0% |
| glass redox: | >=0.30. |

31 Claims, No Drawings

GREY GLASS COMPOSITION

This invention relates to grey glass compositions and methods of making the same. More particularly, this invention relates to grey glass compositions which are capable of achieving high light transmittance in the visible range and acceptable solar properties (e.g., IR and UV reflectance/absorption). Such glass compositions are useful, for example and without limitation, in automotive windows (e.g., windshields, sidelites, backlites and sunroofs) and in architectural/residential window applications.

BACKGROUND OF THE INVENTION

The automotive industry, for a number of years, has desired glass having grey color for automotive window applications. At the same time, it is also desirable for transmission in the UV (ultraviolet) and/or IR (infrared) ranges of the light spectrum to be minimized. Moreover, certain Governmental regulations in the automotive industry have been known to require that visible light transmittance be at least 70% in certain vehicular windows when provided by the original equipment manufacturer in the U.S.A. While a visible transmittance of 70% or higher is not always required, it is safe to say that high visible transmittance (e.g., 65% or higher) in general is often desired. Accordingly, there exists a need for a glass which achieves high visible transmittance as well as adequate blocking of IR and/or UV rays.

A glass window or other glass article is said to have the desirable color "grey" when it has a dominant wavelength of from 435 nm to 570 nm (this dominant wavelength range defines the color "grey" herein). Moreover, grey glass preferably has an excitation purity (Pe) of less than or equal to about 4.5%.

While glass having "grey" color is often desirable, as explained above there sometimes also exists a need or desire to achieve certain levels of light transmission defined conventionally by:

Lta as visible light transmission,
UV as ultraviolet light transmission, and
IR as infrared light transmission.

Glass thickness ranges of from about 1–6 mm, more preferably from about 3–4 mm, are typically used when measuring the aforesaid characteristics. These thickness ranges are generally recognized as conventional thicknesses for glass sheets made by the float glass process, as well as recognized thickness ranges in the automotive industry.

Classically formulated grey glasses, such as architectural, often include low levels of iron (i.e., less than 0.4% total iron) along with cobalt and nickel oxides. Unfortunately, while this type of glass may achieve satisfactory coloration in certain instances, it typically suffers from undesirable solar characteristics (e.g., UV and/or IR blockage).

Certain known green solar control float glasses are formulated so as to achieve desirable solar characteristics due in large part to their use of large quantities of total iron. Unfortunately, the green coloration of such glasses does not always harmonize well with certain exterior automotive paints and sometimes affects vehicle interiors when viewed through the glass, and large amounts of iron are not always desirable for glass processing.

U.S. Pat. No. 6,235,666 discloses a grey glass composition capable of achieving good solar performance characteristics, including the desirable color grey. In particular, U.S. Pat. No. 6,235,666 discloses a grey glass with a colorant portion including 0.5–0.8% total iron (expressed as $Fe_2O_3$), 0.5–3.0% $Er_2O_3$, and 0.0–1.0% $TiO_2$. While this is an excellent glass, it is sometimes undesirable in that it requires much of the very expensive erbium oxide ($Er_2O_3$).

Thus, there exists a need in the art for a grey glass which can achieve desired grey color in combination with acceptable solar performance properties, without the need for much erbium.

WO 02/059052 discloses a grey glass including from about 0.35 to 0.5% total iron and from about 0.5 to 1.2% erbium. Again, erbium is very expensive and such large amounts thereof are not always desired. As explained above, there exists a need in the art for a grey glass which can achieve desired grey color in combination with acceptable solar performance properties, without the need for too much erbium.

U.S. patent application Ser. No. 10/318,358, filed Dec. 13, 2002, also discloses a grey glass composition. Example 1 of 10/318,358 includes 0.28% total iron (expressed as $Fe_2O_3$), 0.18% erbium oxide, 3 ppm Se, 19 ppm cobalt oxide, 0.145% FeO; and a glass redox of 0.5, thereby achieving a visible transmission of about 70.5%, IR transmittance (% IR) of about 40.3, and total solar transmittance (% TS) of about 53.07. Unfortunately, while such glasses of 10/318,358 achieve good color and are acceptable in many respects, they are lacking with respect to UV blocking (reflection and/or absorption) (i.e., too much UV gets through the glass) and IR % as evidenced by the rather high % IR value. In some situations, it may also be desirable for less, or no, erbium to be used for cost purposes.

U.S. Pat. No. 5,364,820 discloses a neutral grey glass. Example 1 of the '820 Patent includes, for example, 0.403% total iron (expressed as $Fe_2O_3$), 0.41% cerium oxide, 0.31% titanium oxide, 23.2 ppm CoO, 7.6 ppm Se, and a glass redox of 0.243. This example of the '820 Patent has a visible transmission of 70.3%, a total solar transmission (% TS) of 60.4%, and an infrared (IR) transmission (% IR) of 59%. Unfortunately, this example of the '820 Patent is undesirable due to its very high IR transmittance (% IR) and also its very high total solar transmittance (% TS). In particular, it is often undesirable to allow this much IR radiation through the glass, especially in automotive applications and the like.

In view of the above, it is apparent that there exists a need in the art for a new glass composition which overcomes one or more of the above problems while achieving desired grey color and desired solar management property(ies) (e.g., UV and/or IR blocking functionality) of the particular industry in which it is to be used.

SUMMARY OF THE INVENTION

An example embodiment of this invention provides a grey glass having a dominant wavelength of from 435 nm to 570 nm and acceptable solar performance characteristics. The glass includes a colorant portion having from 0.25 to 0.70% total iron (expressed as $Fe_2O_3$) (more preferably from 0.30 to 0.60%; most preferably from 0.35 to 0.55%); a glass redox of at least 0.30 (more preferably at least 0.34;most preferably at least 0.38); from 0.01 to 1.0% cerium oxide (more preferably from 0.05 to 0.75%; most preferably from 0.10 to 0.60%); from 0 to 1% titanium oxide (more preferably from 0 to 0.75%; most preferably from 0.05 to 0.60%); from 0.0001 to 0.05% cobalt oxide (more preferably from 0.0005 to 0.01%; most preferably from 0.001 to 0.004%); and from 0.00001 to 0.05% Se (more preferably from 0.00005 to 0.005%; most preferably from 0.0001 to 0.0009%). In certain example embodiments, very small amounts of erbium oxide may also be present in certain example non-limiting instances.

The aforesaid glass compositions surprisingly allow for a high visible transmission to be achieved (e.g., at least 65%, more preferably at least 70%) in combination with good IR and UV blocking functionality. For example, in certain example embodiments of this invention, the glass has, in combination with the aforesaid high visible transmission, % UV no greater than 42% (more preferably no greater than 40%; most preferably no greater than 40%); % IR no greater than 35% (more preferably no greater than 30%; most preferably no greater than 29%); % TS no greater than 52% (more preferably no greater than 50%; most preferably no greater than 49%).

In certain example embodiments of this invention, there is provided a grey glass comprising: a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion comprising, or consisting essentially of,

| total iron (expressed as $Fe_2O_3$) | 0.25 to 0.70% |
|---|---|
| cerium oxide | 0.01 to 1.0% |
| selenium | 0.00001 to 0.05% |
| cobalt oxide | 0.0001 to 0.05% |
| titanium oxide | 0 to 1.0% | wherein the grey glass has a redox value ($FeO/Fe_2O_3$) of at least 0.30, a visible transmittance (Lta) of at least 65%, a dominant wavelength in the range of from 435 nm to 570 nm, an excitation purity (Pe) of no greater than 5.0%, an IR transmittance (% IR) of no greater than 35%, a UV transmittance (% UV) of no greater than 42%, and a total solar transmittance (% TS) of no greater than 52%.

In other example embodiments of this invention, there is provided a glass comprising:

| total iron (expressed as $Fe_2O_3$) | 0.25 to 0.70% |
|---|---|
| cerium oxide | 0.01 to 1.0% |
| selenium | 0.00001 to 0.05% |
| cobalt oxide | 0.0001 to 0.05% |
| titanium oxide | 0 to 1.0% | wherein the glass has a redox value ($FeO/Fe_2O_3$) of at least 0.30, a visible transmittance (Lta) of at least about 65%, a dominant wavelength in the range of from 435 nm to 570 nm, an IR transmittance (% IR) of no greater than 35%, and a UV transmittance (% UV) of no greater than 42%.

DETAILED DESCRIPTION OF CERTAIN EXAMPLE EMBODIMENTS OF THIS INVENTION

Grey glasses according to different embodiments of this invention may be used, for example, as windows in the automotive industry (e.g., windshields, backlites, sidelites, etc.), in architectural applications, and/or in other suitable applications.

Certain glasses according to this invention utilize soda-lime-silica glass as their base composition/glass, to which are added certain ingredients making up a unique colorant portion. An example soda-lime-silica base glass according to certain embodiments of this invention, on a weight percentage basis, includes the following basic ingredients:

TABLE 1

Example Base Glass

| Ingredient | Wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. Preferably, soda-lime-silica base glasses herein include by weight from about 10–15% $Na_2O$ and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments.

In certain example embodiments of this invention, to the base glass (e.g., see Table 1 above) a colorant portion is added which causes the resulting glass to be grey in color (i.e., dominant wavelength of from 435 nm to 570 nm) and achieve desirable solar management properties (e.g., reduced UV and IR transmission coupled with high visible transmission). In certain example embodiments of this invention, the colorant portion that is added to the base glass is substantially free of nickel and/or chromium (i.e., no more than about 0.0010% Ni and/or NiO; and/or no more than about 0.01% (more preferably no more than 0.003%, and most preferably no greater than 0.001%) chromium including oxides thereof), and is characterized as set forth in Table 2 below (in terms of weight percentage of the total glass composition in the final glass product). The colorant portions in different embodiments of this invention may either comprise the materials in Table 2 below, or consist essentially of the materials in Table 2 below.

TABLE 2

Example Colorant Portion

| Ingredient | Preferred | More Preferred | Most Preferred |
|---|---|---|---|
| Total iron (expressed as $Fe_2O_3$): | 0.25 to 0.70% | 0.30 to 0.60% | 0.35 to 0.55% |
| Cerium oxide (e.g., $Ce_2O_3$): | 0.01 to 1.0% | 0.05 to 0.75% | 0.10 to 0.60% |
| Selenium (Se): | 0.00001–0.05% | 0.00005–0.005% | 0.0001–0.0009% |
| Cobalt oxide (e.g., $Co_3O_4$): | 0.0001–0.05% | 0.0005–0.01% | 0.0010–0.004% |
| Titanium Oxide (e.g., $TiO_2$): | 0 to 1.0% | 0 to 0.75% | 0.05 to 0.60% |
| % FeO (wt. % spectral): | <=0.32 | <=0.25 | 0.10 to 0.22 |
| Glass Redox ($FeO/Fe_2O_3$): | >=0.30 | >=0.34 | >=0.38 |

However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention. Moreover, in certain example instances, from 0 to 0.3% erbium oxide (sometimes from 0.00001 to 0.2%) may be provided in the glass.

The aforesaid colorant portion allows grey color to be achieved, while at the same time maintaining satisfactory solar performance properties including high visible transmission coupled with low IR (infrared) and low UV (ultraviolet) transmittance. In particular, in certain example embodiments the colorant portion allows improved IR absorption (a type of solar performance) by having a rather high glass redox; and thus a high amount of IR absorber FeO relative to total iron. However, if the blue color resulting from the high redox (i.e., the relatively high amount of FeO) is not adequately compensated for, then the glass will no longer be grey. Selenium and cobalt are used to compensate for this blue/green and yellow/green coloration caused by the iron in the ferric and ferrous states.

Moreover, cerium oxide is added for the purpose of improving UV blockage. However, cerium oxide functions as an oxidizer thereby causing FeO in the batch to oxidize. Unfortunately, significant oxidation of FeO in the batch would be undesirable because this would reduce IR blockage (i.e., it would cause % IR to increase) by lowering the glass redox. Thus, we do not want too much oxidation to occur, because a low % IR (i.e., low IR transmittance) is desired. In order to compensate for the oxidizing function of cerium oxide, and allow for low % IR, sufficient reducing agent(s) (e.g., Si, C and/or any other suitable reducing agent(s)) are added to the batch to maintain a rather high glass redox in the final glass thereby allowing both low % IR and low % UV to be realized. In certain example embodiments, from 0.1 to 0.25% metallic Si may be added to the batch as a reducing agent in this respect.

Thus, it has surprisingly been found in certain example embodiments of this invention that the use of cerium oxide in combination with the aforesaid reducing agent(s) in the aforesaid iron inclusive glass composition allows for a rather high glass redox which permits desired grey color and high visible transmission to be coupled with low UV transmission and low IR transmission.

In certain example embodiments herein, glasses may be characterized by one or more of the optical characteristics set forth below when measured at a nominal thickness of from 1–6 mm, more preferably from about 3–4 mm (about 3 or 4 mm may be used for a reference thickness in certain example non-limiting embodiments). In Table 3, color values a*, b* and L* are in accordance with Ill. D65, 10 degree observer, as is known in the art.

TABLE 3

Example Optical Characteristics

| Characteristic | Preferred | More Preferred | Most Preferred |
|---|---|---|---|
| Lta (visible transmittance): | >=65% | >=70% | >=71% |
| IR$_{transmission}$ (% IR): | <=35% | <=30% | <=29% |
| UV$_{transmission}$ (% UV): | <=42% | <=40% | <=38% |
| % TS (total solar): | <=52% | <=50% | <=49% |
| Dominant Wavelength ($\lambda$): | 435–570 nm | 470–555 nm | 480–520 nm |
| Excitation Purity (Pe): | <=5.0 | <=4.5 | <=3.0 |
| a* (Ill. D65, 10 deg): | −8 to +2 | −4 to +1 | −2 to 0 |

TABLE 3-continued

Example Optical Characteristics

| Characteristic | Preferred | More Preferred | Most Preferred |
|---|---|---|---|
| b* (Ill. D65, 10 deg): | −5 to +5 | −3 to +3 | −1.5 to +1.5 |
| L* (Ill. D65, 10 deg.): | 80 to 95 | 84 to 91 | 85 to 90 |

The "grey" color achieved by glasses according to certain example embodiments of this invention is a function of dominant wavelength and excitation purity. Grey glass herein typically has a dominant wavelength of from 435 nm to 570 nm, and an excitation purity (Pe) of no greater than about 5.0 or 4.5%. Moreover, it can be seen from the above that desired grey coloration and high visible transmission have surprisingly been coupled with low IR and low UV transmittance values.

The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., FeO/$Fe_2O_3$) of at least 0.30, more preferably at least 0.34 and most preferably at least 0.38. It is noted that in different embodiments of this invention iron may be added to the glass batch during the manufacturing process in any suitable form (e.g., via rouge and/or melite).

Glass according to certain embodiments of this invention is often made via the known float process in which a tin bath is utilized. It will thus be appreciated by those skilled in the art that as a result of forming the glass on molten tin in certain example embodiments, small amounts of tin or tin oxide may migrate into surface areas of the glass on the side that was in contact with the tin bath during manufacture (i.e. typically, float glass may have a tin oxide concentration of 0.05% or more (wt.) in the first few microns below the surface that was in contact with the tin bath).

Se (selenium) may be present in the colorant portion in different embodiments, and acts as a pink colorant. While selenium often combines with iron as iron selenide (FeSe) in glass to produce brown color, selenium is referred to in the colorant portion herein as "Se" which is meant to include, for example, its state as Se as well as its other states in glass such as FeSe.

Cobalt (Co) is a blue colorant. It is believed that much of the cobalt in the glass is in the oxide state of $Co_3O_4$. However, other oxide states of CoO are also possible in glasses according to this invention. Thus, unless expressly stated to the contrary, the terms "cobalt oxide", "CoO" and "$Co_3O_4$" as used herein include not only cobalt in this/these particular oxide state(s), but also include(s) cobalt which may be present in other oxide or non-oxide state(s).

Erbium (Er) is a pink colorant. In certain embodiments of this invention, glasses herein are free of erbium (and erbium oxide). However, in other example embodiments, small amounts of erbium may be used as mentioned above. In such cases, it is believed that much of the erbium in the glass is in the oxide state of $Er_2O_3$. However, other oxide states of erbium are also possible in glasses according to this invention. Thus, unless expressly stated to the contrary, the terms "erbium oxide" and "$Er_2O_3$," as used herein include not only erbium in this/these particular oxide state(s), but also include(s) erbium which may be present in other oxide or non-oxide state(s).

Cerium oxide is used primarily herein as a UV absorber, but is referred to as a colorant since it acts as a chemical decolorizer as will be explained below. Unfortunately, as explained above, cerium oxide acts as an oxidizer when added to the glass batch. Cerium, for example, may be added to the batch in the form of $CeO_2$, and may take the form of $Ce_2O_3$ (or any other suitable form) in the final glass. According to certain example embodiments of this invention, the presence of cerium oxide (e.g., $CeO_2$) as an oxidizer in the glass batch acts as a chemical decolorizer since during melting of the glass batch it causes iron in the ferrous state ($Fe^{2+}$; FeO) to oxidize to the ferric state ($Fe^{3+}$) as illustrated by the following equation:

$$Fe^{2+}+Ce^{4+}=Fe^{3+}+Ce^{3+} \quad (1)$$

Equation (1) shows that the presence of cerium oxide in the glass batch causes an amount of the strong blue-green colorant of ferrous iron ($Fe^{2+}$; FeO) to oxidize into the weaker yellow-green ferric iron colorant ($Fe^{3+}$) during the glass melt (note: some ferrous state iron will usually remain in the resulting glass, as potentially may some $Ce^{4+}$). Typically, a significant portion of the $CeO_2$ added to the original glass batch prior to the melt is transformed during the melt into $Ce_2O_3$ which is present in the resulting glass. As a result of the cerium oxide in the batch, the iron normally would be oxidized to a very low FeO (ferrous state) content. However, this would be undesirable according to certain example embodiments of this invention as it would mean that % IR would significantly increase (i.e., FeO is an IR absorber). In order to prevent this from occurring (i.e., in order to prevent bad IR performance), a higher glass redox and thus a larger FeO content is achieved by adding reducing agent(s) to the batch as discussed above in amounts sufficient to allow for the IR %, TS % and/or glass redox characteristics discussed herein to be achieved, thereby compensating for the oxidizing functionality of the cerium oxide. Thus, the desired UV absorption associated with cerium oxide can be achieved, without suffering from the oxidation functionality thereof.

Titanium oxide is an optional colorant, which also performs UV absorption functionality, in certain example embodiments of this invention. Numerous oxide states of Ti are possible. Thus, unless expressly stated to the contrary, the terms "titanium oxide" and "$TiO_2$," as used herein include not only Ti in this/these particular oxide state(s), but also include(s) Ti which may be present in other oxide or non-oxide state(s).

EXAMPLES

The glasses of certain example embodiments of this invention may be made from batch ingredients using well known glass melting and refining techniques once given the above final glass analysis. Experimental 100 gm glass melts were made in platinum crucibles using a standard electric melting furnace set-up for soda-lime-silica glass compositions, that is, a melting temperature of about 1500 degrees C., a melting time of about 4 hours in air medium, an annealing temperature of about 620 to 680 degrees C., an annealing time of about 0.5 hours, and a cool down to room temperature by inertia after annealing furnace shut-down. The glass was cast into graphite molds, annealed and cooled down, then ground and polished for visual evaluation and spectral measurements. Salt cake (and often crystalline water) was used as refining agents in a known manner. SiO, Si and/or calcumite were used as reducing agents in amounts sufficient to achieve the redox values listed below. The following base glass batch was used for the Examples herein (note: the below-listed ingredients in the batch will add up to 100% by weight once oxides thereof are accounted for; thus, they need not add up to one hundred as raw materials):

TABLE 4

Base Glass for Examples

| Batch Ingredient for Base Glass | Parts by Wt. % |
|---|---|
| sand | 71.5 |
| soda ash | 23.7 |
| dolomite | 18.32 |
| limestone | 6.1 |

In addition to the base glass materials, the final glasses of the different Examples herein included the following colorant portions, respectively, in terms of wt. % of the total glass if not indicated otherwise. The redox in the table below is the glass redox, as opposed to the batch redox. The % FeO content was measured spectrally.

TABLE 5

Colorant Portions of Examples

| Mat'l/Property | Ex. 1 | Ex. 2 | Ex. 3 | Ex. 4 |
|---|---|---|---|---|
| total iron ($Fe_2O_3$): | 0.43% | 0.46% | 0.50% | 0.45% |
| cerium oxide: | 0.3% | 0.3% | 0.3% | 0.2% |
| selenium (Se): | 0.0003% | 0.0005% | 0.0005% | 0.0003% |
| cobalt oxide ($Co_3O_4$): | 0.0019% | 0.002% | 0.0015% | 0.0022% |
| titanium oxide ($TiO_2$): | 0.2% | 0.1% | 0% | 0% |
| % FeO: | 0.1825 | 0.1983 | 0.2053 | 0.180 |
| Redox (FeO/$Fe_2O_3$): | 0.42 | 0.43 | 0.41 | 0.40 |

Solar characteristics for the example glasses at about 4 mm thickness were as follows, where L*, a* and b* were measured with respect to Ill. D65, 10 degree observer:

TABLE 6

Solar Characteristics of Examples

| Property | Ex. 1 | Ex. 2 | Ex. 3 | Ex. 4 |
|---|---|---|---|---|
| Lta (visible trans. %): | 71.08 | 71.3 | 70.01 | 70.4 |
| % IR: | 27.22 | 25.6 | 24.44 | 28.33 |
| % UV: | 35.7 | 36.3 | 37.22 | 38.52 |
| % TS: | 48.01 | 46.1 | 44.4 | 48.3 |
| L*: | 88.54 | 86.98 | 87.09 | 87.02 |
| a*: | −5.04 | −4.61 | −3.8 | −4.02 |
| b*: | −0.34 | 0.43 | 0.12 | −0.33 |
| Excit. Purity (Pe %): | 3.07 | 2.04 | 2.16 | 2.97 |
| Dom. Wavelength (nm): | 492 | 501 | 492 | 494 |

The aforesaid colorant portion allows for grey color to be achieved, while at the same time maintaining satisfactory solar performance properties such as high visible transmission coupled with low IR and low UV transmission. Thus, it has surprisingly been found in certain example embodiments that the rather high redox can be achieved with a glass which uses cerium oxide and a rather low amount of total iron, Se and/or Co in order to allow for the aforesaid characteristics to be realized without requiring too much total iron and/or expensive erbium.

Terms used herein are known in the glass art. For example, luminous transmittance (Lta) (2 degree observer)

is understood in the art, and is used herein in accordance with its known meaning. This term is also known as Ill. A visible transmittance (380–780 nanometers inclusive), and its measurements are made in accordance with CIE Publication 15.2 (1986)). The terms, and characteristics, of ultraviolet light transmittance (% UV), infrared energy transmittance (% IR), total solar transmittance (% TS), dominant wavelength (DW) and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (% UV) may be measured using Parry Moon Air Mass=2 (300–400 nm inclusive, integrated using Simpson's Rule at 10 nm intervals). IR transmittance may be conventionally measured using Simpson's Rule and Parry Moon Air Mass=2 over the wavelength range 800–2100 nm inclusive at 50 nm intervals. % TS (300–2,100 nm) is also known in the art. Dominant wavelength (DW) may be calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") may be measured conventionally in accordance with CIE Publication 15.2 (1986) and ASTM: E 308-90.

Once given the above disclosure many other features, modifications and improvements will become apparent to the skilled artisan. Such features, modifications and improvements are therefore considered to be a part of this invention, the scope of which is to be determined by the following claims:

What is claimed is:
1. A grey glass comprising:
a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion consisting essentially of:

| | |
|---|---|
| total iron (expressed as $Fe_2O_3$) | 0.25 to 0.70% |
| cerium oxide | 0.01 to 1.0% |
| selenium | 0.00001 to 0.05% |
| cobalt oxide | 0.0001 to 0.05% |
| titanium oxide | 0 to 1.0% | wherein the grey glass has a redox value ($FeO/Fe_2O_3$) of at least 0.30, a visible transmittance (Lta) of at least 65%, a dominant wavelength in the range of from 435 nm to 570 nm, an excitation purity (Pe) of no greater than 5.0%, an IR transmittance (% IR) of no greater than 35%, a UV transmittance (% UV) of no greater than 40%, and a total solar transmittance (% TS) of no greater than 52%.

2. The glass of claim 1, wherein the glass has a redox value ($FeO/Fe_2O_3$) of at least 0.34, a visible transmittance (Lta) of at least 70%, an IR transmittance (% IR) of no greater than 30%.

3. The glass of claim 2, wherein said dominant wavelength and excitation purity are measured at a nominal thickness of the glass of anywhere from 3 mm to 4 mm, and wherein the glass has a dominant wavelength of from 480 to 520 nm and an excitation purity (Pe) of no greater than 3.0%.

4. The glass of claim 1, wherein the glass is substantially free of nickel and chromium.

5. The glass of claim 1, wherein the glass has a redox value ($FeO/Fe_2O_3$) of at least 0.38.

6. The glass of claim 1, wherein the glass has a % TS of no greater than 50%.

7. The glass of claim 1, wherein said colorant portion consists essentially of:

| | |
|---|---|
| total iron (expressed as $Fe_2O_3$) | 0.3 to 0.6% |
| cerium oxide | 0.05 to 0.75% |
| selenium | 0.00005 to 0.005% |
| cobalt oxide | 0.0005 to 0.01% |
| titanium oxide | 0 to 0.75%. |

8. The glass of claim 1, wherein the glass has a visible transmission Lta of at least about 70%.

9. The glass of claim 1, wherein said colorant portion consists essentially of:

| | |
|---|---|
| total iron (expressed as $Fe_2O_3$) | 0.35 to 0.55% |
| cerium oxide | 0.10 to 0.60% |
| selenium | 0.0001 to 0.0009% |
| cobalt oxide | 0.001 to 0.004% |
| titanium oxide | 0.05 to 0.6%. |

10. The glass of claim 1, wherein the glass has a % IR of no greater than 29%.

11. The glass of claim 1, wherein the glass has a % IR of no greater than 29% and a % TS of no greater than 49%.

12. The glass of claim 1, wherein the glass has a color characterized as follows when measured according to Ill. D65, 10 degree observer:

| | |
|---|---|
| a* | from −4 to +1 |
| b* | from −3 to +3 |
| L* | from 80 to 95. |

13. A grey glass comprising:
a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion comprising:

| | |
|---|---|
| total iron (expressed as $Fe_2O_3$) | 0.25 to 0.70% |
| cerium oxide | 0.01 to 1.0% |
| selenium | 0.00001 to 0.05% |
| cobalt oxide | 0.0001 to 0.05% |
| titanium oxide | 0 to 1.0% | wherein the grey glass has a redox value ($FeO/Fe_2O_3$) of at least 0.30, a visible transmittance (Lta) of at least 65%, a dominant wavelength in the range of from 435 nm to 570 nm, an excitation purity (Pe) of no greater than 5.0%, an IR transmittance (% IR) of no greater than 35%, a UV transmittance (% UV) of no greater than 40%, and a total solar transmittance (% TS) of no greater than 52%, and wherein the glass is substantially free of nickel.

14. The glass of claim 13, wherein the glass has a redox value ($FeO/Fe_2O_3$) of at least 0.34, a visible transmittance (Lta) of at least 70%, an IR transmittance (% IR) of no greater than 30%, and a UV transmittance (% UV) of no greater than 40%.

15. The glass of claim 14, wherein said dominant wavelength and excitation purity are measured at a nominal thickness of the glass of anywhere from 3 mm to 4 mm, and wherein the glass has a dominant wavelength of from 480 to 520 nm and an excitation purity (Pe) of no greater than 3.0%, and wherein the colorant portion comprises from 0 to 0.3% erbium oxide.

16. The glass of claim 13, wherein the glass is substantially free of chromium.

17. The glass of claim 13, wherein the glass has a redox value ($FeO/Fe_2O_3$) of at least 0.38.

18. The glass of claim 13, wherein the glass has a % TS of no greater than 50%.

19. The glass of claim 13, wherein said colorant portion comprises:

| | |
|---|---|
| total iron (expressed as $Fe_2O_3$) | 0.3 to 0.6% |
| cerium oxide | 0.05 to 0.75% |
| selenium | 0.00005 to 0.005% |
| cobalt oxide | 0.0005 to 0.01% |
| titanium oxide | 0 to 0.75%. |

20. The glass of claim 13, wherein the glass has a visible transmission Lta of at least about 70%.

21. The glass of claim 13, wherein said colorant portion comprises:

| | |
|---|---|
| total iron (expressed as $Fe_2O_3$) | 0.35 to 0.55% |
| cerium oxide | 0.10 to 0.60% |
| selenium | 0.0001 to 0.0009% |
| cobalt oxide | 0.001 to 0.004% |
| titanium oxide | 0.05 to 0.6%. |

22. The glass of claim 13, wherein the glass has a % IR of no greater than 29%.

23. The glass of claim 13, wherein the glass has a % IR of no greater than 29% and a % TS of no greater than 49%.

24. The glass of claim 13, wherein the glass has a color characterized as follows when measured according to Ill. D65, 10 degree observer:

| | |
|---|---|
| a* | from −4 to +1 |
| b* | from −3 to +3 |
| L* | from 80 to 95. |

25. Glass comprising:

| | |
|---|---|
| total iron (expressed as $Fe_2O_3$) | 0.25 to 0.70% |
| cerium oxide | 0.01 to 1.0% |
| selenium | 0.00001 to 0.05% |
| cobalt oxide | 0.0001 to 0.05% |
| titanium oxide | 0 to 1.0% | wherein the glass has a redox value ($FeO/Fe_2O_3$) of at least 0.30, a visible transmittance (Lta) of at least about 65%, a dominant wavelength in the range of from 435 nm to 570 nm, an IR transmittance (% IR) of no greater than 35%, and a UV transmittance (% UV) of no greater than 40%, and wherein the glass is substantially free of nickel.

26. The glass of claim 25, wherein the glass has a redox value ($FeO/Fe_2O_3$) of at least 0.34, a visible transmittance of at least about 70%.

27. The glass of claim 25, wherein the glass is substantially free of chromium.

28. The glass of claim 25, wherein the glass has a redox value ($FeO/Fe_2O_3$) of at least 0.38.

29. The glass of claim 25, wherein the glass has a total solar transmittance (% TS) of no greater than 50%.

30. The glass of claim 25, wherein a colorant portion of the glass consists essentially of:

| | |
|---|---|
| total iron (expressed as $Fe_2O_3$) | 0.3 to 0.6% |
| cerium oxide | 0.05 to 0.75% |
| selenium | 0.00005 to 0.005% |
| cobalt oxide | 0.0005 to 0.01% |
| titanium oxide | 0 to 0.75% |
| erbium oxide | 0 to 0.3%. |

31. The glass of claim 25, wherein the glass has a visible transmission Lta of at least about 70%.

* * * * *